June 6, 1944.   J. MIHALYI   2,350,793
REFLECTING CAMERA
Filed Jan. 6, 1942
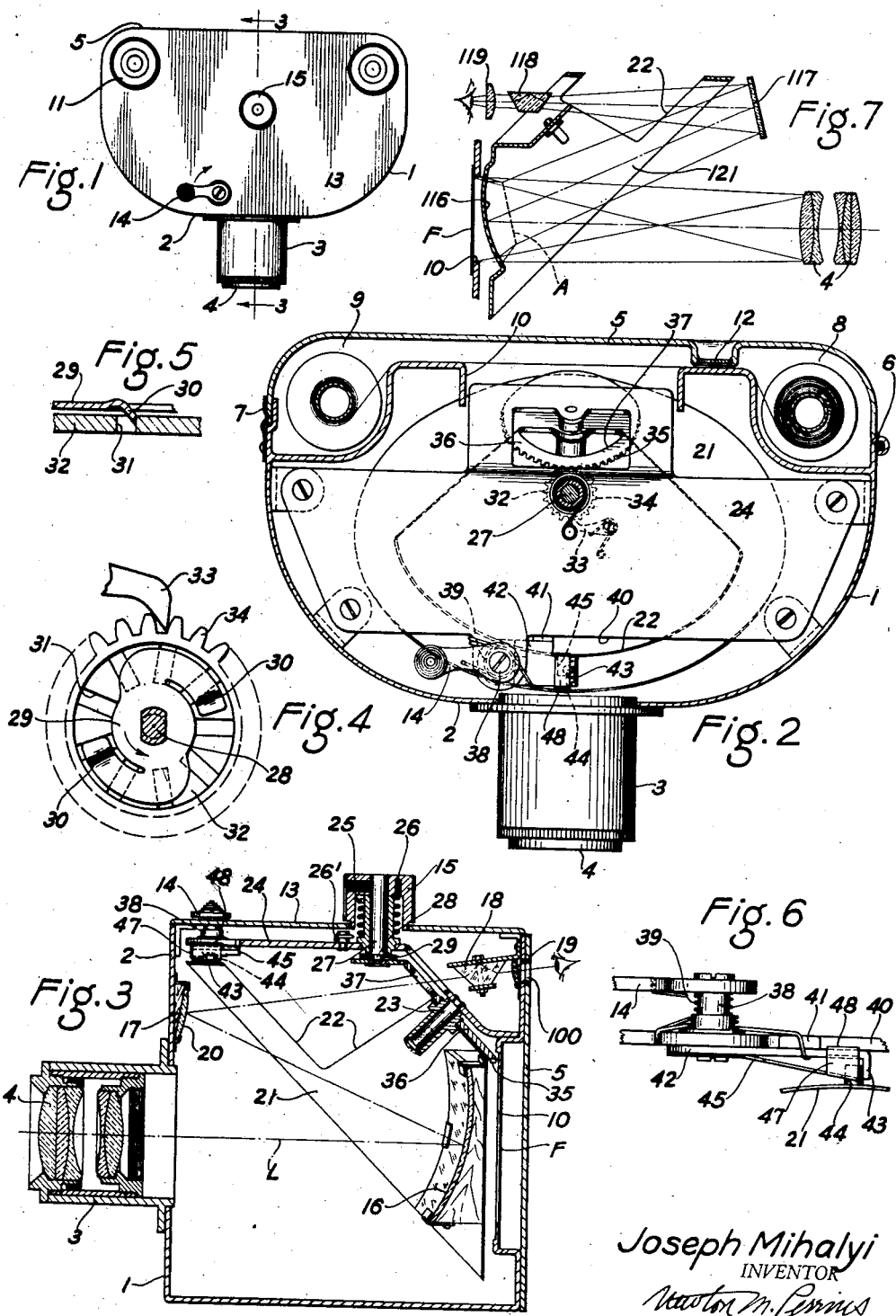
Joseph Mihalyi
INVENTOR
BY
ATTORNEYS Patented June 6, 1944

2,350,793

UNITED STATES PATENT OFFICE 2,350,793

REFLECTING CAMERA

Joseph Mihalyi, Rochester, N. Y., assignor to Eastman Kodak Company, Rochester, N. Y., a corporation of New Jersey Application January 6, 1942, Serial No. 425,795

19 Claims. (Cl. 95—42)

This invention relates to photography and more particularly to photographic cameras. One object of my invention is to provide a camera which is relatively compact, which will present to the eye of a user a relatively large image of the field of view and eliminate parallax in the view finder system. Another object of my invention is to provide a camera with an optical system for producing an image of the field of view in such a manner that the camera may be held at eye level when taking pictures and in such a manner that the field of view may normally be seen through the finder but is momentarily obscured as a picture is taken. Another object of my invention is to provide a parallax-free finder including a shutter member which carries a part of the finder optical system, the shutter member being so arranged that the view finder opening is obscured during the time that an exposure is being made and is uncovered automatically after the completion of an exposure. Other objects will appear from the following specification, the novel features being particularly pointed out in the claims at the end thereof:

Fig. 1 is a top plan view indicating a camera constructed in accordance with and embodying a preferred form of my invention;

Fig. 2 is an enlarged sectional view taken through the camera shown in Fig. 1 with certain parts being omitted for clearness;

Fig. 3 is an enlarged section taken on line 3—3 of Fig. 1 showing the more important parts of my improved camera construction;

Fig. 4 is a fragmentary detail of a portion of a spring tensioning device for the camera shutter;

Fig. 5 is a fragmentary detail of a portion of the shutter tensioning device;

Fig. 6 is a fragmentary detail of a portion of a shutter release and latching mechanism; and Fig. 7 is a schematic view partially in section showing a slightly different embodiment of my invention.

In many cameras the view finder system is spaced from the camera objective and consequently the view finder does not give exactly the same view as may be obtained when a photograph is made through an objective in the usual manner. In the present instance I utilize the camera objective both for making images at the focal plane of the camera and for forming the front lens of a view finder optical system, certain parts of which may be carried by a movable member mounted between the camera objective and the exposure frame when in a position for composing the picture. When a picture is to be made the movable member may move in timed relation to a camera shutter so that the view finder is momentarily obscured as a picture is taken and preferably so that the view finder will be uncovered as soon as a shutter covers the exposure aperture.

Coming now to my invention a simple form of my camera may consist of a camera body 1 having on the front wall 2 a lens mount 3 carrying any suitable objective 4. The rear wall 5 of the camera preferably is hinged at 6 and is provided with a latch at 7 so that the camera back may be swung open to expose a supply film chamber 8 and a take-up film chamber 9 to either side of an exposure frame 10. A winding knob 11 on the outside of the camera may serve to move the film from the supply chamber 8 to the take-up chamber 9 and the number of exposures may be seen through the usual window 12 covered with a red or green filter.

On the top wall 13 of the camera I prefer to place a trigger member 14 and a shutter tensioning knob 15.

In the preferred embodiment of my invention shown in Fig. 3 it will be noticed that the objective 4 normally forms an image on a film F stretched across the exposure frame 10. However, when the camera is in position for composing a picture, a concave reflector 16 lies between the exposure frame 10 and the objective 4 and this reflector serves both as an image forming element and a field element. In other words, the reflector 16 has sufficient power to form an aerial image, indicated A in Fig. 7, between the camera objective and the exposure frame and this image is reflected by a mirror 17 rearwardly along a line substantially parallel to the lens axis L where it may be erected by an erecting prism 18 which lies just in front of an eyepiece or lens 19.

In the embodiment of my invention as shown in Fig. 3 the mirror 17 includes a lens element 20 so that the lens 19 of the eyepiece and the lens 20 permit the aerial image to be properly focused and thus give the appearance of a large and brilliant image of the field of view. In fact, the field of view appears to be of substantially the same size as the exposure frame.

As also indicated in Fig. 3, the optical element 16 is carried by a movable member 21 which is mounted to move between the objective 4 and the exposure frame 10 to swing the optical element 16 to and from its view finding position shown in this figure. If desired, the movable element 21 may be in the form of a truncated cone-shaped member having a slot 22 which may form a shutter member and being mounted to swing upon a stud 23 carried by a bracket 24 which in turn is supported by the camera walls.

In order to move the movable member I provide a power spring 25, the upper end of which 26 is attached to the winding knob 15 and the lower end of which 26' is anchored on the frame member 24. The winding knob 15 carries a post 27 having a squared end 28 (Fig. 4), this squared end carrying a spring member 29 having downwardly extending arms 30 so positioned that one or more of these arms may engage one or more slots 31 in the gear 32 as best shown in Fig. 5. A pawl 33 engaging the gear teeth 34 prevent rearward movement of the knob so that it may be turned with a number of short turns to tension the driving spring 25. When an exposure is made and the gear is turned by the spring arms 30 in the direction opposite to that shown by the arrow in Fig. 4, the teeth 34 of the gear mesh with teeth 35 carried by a gear 36 attached to the truncated cone-shaped member 21, thus causing the spring 25 to rotate this member. As it rotates, the first part of the movement removes the optical element 16 from in front of the exposure frame 10 and permits the objective 4 to make an exposure when the slot 22 of the movable member 21 passes the exposure frame.

In the present form of my invention it is desirable to have the movable member make one revolution at each actuation of the trigger 14. As indicated in Fig. 6, the trigger 14 is attached to a post 38 encircled by a spring 39 normally holding the trigger against a suitable stop which may include an edge wall 40 of the bracket 24 and a lug 41 on the trigger arm 42 as shown in Fig. 6. When the trigger 14 is turned in the direction shown by the arrow in Fig. 1, the turned down end 43 of the arm 42 rides away from a pin 44 carried by the movable member 21 so that if the spring 25 is tensioned, the movable member 21 will swing through approximately 360° or until the pin 41 rides under the spring arm 45 attached to the bottom of the arm 42 as shown in Fig. 6. This spring arm has an upstanding lug 47 which is bent at 48 to lie over the top of the arm 42.

After each revolution of the movable member 21 about its axis 23 the parts reach the position shown in Figs. 3 and 6 at which time it is necessary to turn the winding knob 15 to tension the spring 25.

I have shown in Fig. 7 a modification of the embodiment of my invention shown in Fig. 3, wherein the objective 4 is mounted as in the first embodiment and wherein the movable member 121 differs from member 21 in that the optical element 116 is formed directly in the metal of which the element 121 is made. As in the first embodiment the film F lies across an exposure frame 10 and it would normally receive an image formed by the objective 4, but when the optical element 116 lies in its path as shown in Fig. 7, this optical element with the objective 4 produces an image of the field of view of slightly smaller size than the field at the exposure frame as indicated at A. In this instance the image at A may be viewed after reflection by the mirror 117 after it is erected by the erecting prism 118 behind which is an eyepiece 119. It may be pointed out that if desired the erecting prism 118 may be omitted if it is necessary to reduce costs to a minimum. It is, however, more difficult to properly visualize the field of view if the image is inverted. In the embodiment shown in Fig. 7 the eyepiece 119 is focused directly upon the image A, the mirror 117 having a plane surface without power. If, however, some power is required as in Fig. 3, the lenses 17 and 19 together focus the aerial image which is in front of the optical element 16.

In both forms of my invention it will be noticed that the camera is constructed so that it may be used at eye level and so that the line of vision is substantially axially arranged with respect to the axis of the objective. In Fig. 3, the line of sight is at a small angle to the axis of the objective, thus permitting the line of sight to be slightly downward with respect thereto, but this may sometimes be considered an advantage.

The movable member 21 in both forms of my invention is provided with an arcuate opening 37 which opening is so positioned that the field of view may pass through this opening during the major part of movement of the movable member. This opening may be conveniently formed around the axis 23 and may be of substantially 180°, although the extent of this opening is mostly a matter of design. In the present instance the opening 22 of the shutter may be of approximately 45°, if the shutter is to have a fixed opening. However, the size of the opening may vary with the power of the spring used. Usually if there is only a single exposure the duration should be between 1/25 and 1/50 of a second.

With a camera constructed in accordance with either embodiment of my invention the operation of taking a picture is extremely simple for after winding the winding knob 11 until a fresh film is positioned at the exposure aperture 10, it is only necessary to turn the knob 15 until the spring is wound when spring 25 is under tension, the operator by looking through the viewing aperture 100 in the back wall 5 of the camera may observe what appears to be a full size image, right side up. When the picture is composed the trigger member 14 is moved in the direction shown by the arrow (Fig. 1) so that the movable member 21 may swing the optical element 16 out of the path of light going toward the exposure frame 10 and this movement will close the viewing opening by moving the opening 37 from the position shown in Fig. 3. Continued movement of the movable member 21 may cause the slot 22 to swing across the film F making an exposure and to continue swinging until the latch pin 44 snaps under the spring 45 and is held in a latched position against the end 43 of the trigger member. The view opening is again uncovered so that the second picture can be observed.

It will be noticed that in both forms of my invention the movable members 21 or 121 are so mounted that they may lie very close to the film F and close to the exposure frame 10. In both instances, the movable member may swing to move the optical elements 16 or 116 from their image forming position to a position which will permit an exposure to be made. In both embodiments of my invention the movable member is so aranged that the view opening is uncovered only when the exposure frame is covered and the exposure frame is uncovered—for making an exposure—only when the view opening is covered. Thus, light cannot enter the view opening to fog film and the film is covered when the optical elements are in position to form an image for composing a picture.

What I claim and desire to secure by Letters Patent of the United States is:

1. In a camera, the combination with a camera body of an objective carried thereby, an exposure frame, and a movable member between the exposure frame and the objective and including a curved flange having a generation line movable into a position substantially parallel to the exposure frame, a concave reflector carried by the said flange of the movable member, said movable member being mounted to bring the concave reflector into a position adjacent to but spaced from the exposure frame.

2. In a camera, the combination with a camera body of an objective carried thereby, an exposure frame, and a movable member between the exposure frame and the objective and including a curved flange having a generation line movable into a position substantially parallel to the exposure frame, a concave reflector carried by the said flange of the movable member, said movable member being mounted to bring the concave reflector into a position to overlie the exposure frame and to receive light rays passing from the camera objective toward said exposure frame, said movable member including an exposure aperture and said curved flange normally blocking light from the objective to the film, thereby constituting a shutter.

3. In a camera, the combination with a camera body of an objective carried thereby, an exposure frame, and a movable member between the exposure frame and the objective and including a curved flange having a generation line movable into a position substantially parallel to the exposure frame, a concave reflector carried by the flange of said movable member, said movable member being mounted to bring the concave reflector into a position to overlie the exposure frame and to receive light rays passing from the camera objective toward said exposure frame, said movable member including an exposure aperture, said curved flange normally blocking light from the objective to the film, thereby constituting a shutter, and a second aperture in the movable member through which light rays reflected by said concave reflector for defining the field of view may pass.

4. In a camera, the combination with a camera body, including an exposure frame and an objective spaced therefrom, of a movable member, a conical flange carried thereby positioned to move to and from a position between the objective and exposure frame and having a generation line close to and substantially parallel to the exposure frame, an optical component having focusing power carried by the movable member for movement therewith and into a position along the axis of the objective, to form, with the objective, an aerial image of the field of view spaced from the exposure frame and at least partially located between the exposure frame and the objective.

5. In a camera, the combination with a camera body, including an exposure frame and an objective spaced therefrom, of a movable member, a flange carried thereby and positioned to move to and from a position between the objective and exposure frame and having a generation line close to and substantially parallel to the exposure frame, an optical component having focusing power carried by the flange of the movable member for movement therewith and into a position along the axis of the objective, to form, with the objective, an aerial image of the field of view spaced forwardly from the exposure frame, said optical component, when in said position along the axis of the objective, constituting primarily a collective element.

6. In a camera, the combination with a camera body, including an exposure frame and an objective spaced therefrom, of a movable member, a curved flange thereon positioned to move to and from a position between the objective and exposure frame and having a generation line close to and substantially parallel to the exposure frame, an optical component having focusing power carried by the flange of the movable member for movement therewith and into a position along the axis of the objective and close to the exposure frame, to form, with the objective an aerial image of the field of view spaced from the exposure frame, said optical component, when in said position along the axis of the objective, constituting primarily a collective element of substantially the size of the exposure frame.

7. In a camera, the combination with a camera body, including an exposure frame and an objective spaced therefrom, of a movable member, a curved flange thereon positioned to move to and from a position between the objective and exposure frame and having a generation line close to and substantially parallel to the exposure frame, an optical component having focusing power carried by the flange of movable member for movement therewith and into a position along the axis of the objective, to form with the objective, an aerial image of the field of view spaced from the exposure frame and at least partially between the exposure frame and the objective, said optical component, when in said position along the axis of the objective, constituting primarily a collective element and, secondarily, an image-forming element.

8. In a camera, the combination with a camera body, including an exposure frame and an objective spaced therefrom, of a movable member, a curved flange thereon positioned to move to and from a position between the objective and exposure frame and having a generation line substantially parallel to the exposure frame, an optical component having focusing power carried by the flange of the movable member for movement therewith and into a position along the axis of the objective, to form, with the objective, an aerial image of the field of view immediately in front of said optical component and slightly reducing the size of said image from that received by the exposure frame when said movable member is moved.

9. In a camera, the combination with a camera body, including an exposure frame and an objective spaced therefrom, of a movable member, a curved flange thereon positioned to move to and from a position between the objective and exposure frame and having a generation line close to and substantially parallel to the exposure frame, an optical component having focusing power carried by the flange of the movable member for movement therewith and into a position along the axis of the objective, said optical component constituting both a field element and an image-forming element.

10. In a camera, the combination with a camera body, including an exposure frame and an objective spaced therefrom, of a movable member, a curved flange thereon positioned to move to and from a position between the objective and exposure frame and having a generation line substantially parallel to and close to the exposure frame, an optical component having focusing power carried by said flange of the movable member for movement therewith and into a position along the axis of the objective and close to the exposure frame, said optical component constituting both a field element and an image-forming element adjacent to the exposure frame and adapted to slightly reduce the size of the field of view with respect to the exposure frame and positioned at such an angle to the lens axis that the reproduced aerial field of view may be viewed by reflection, and means including an eye piece and mirror carried by the camera for viewing the aerial image so produced, the eye piece being located above the exposure frame.

11. In a camera of the type including a camera body having an exposure frame and an objective spaced therefrom, the combination with a shutter member mounted to move about an axis at an angle to the axis of the objective, said shutter member including a truncated cone shaped shield having a generation line extending substantially parallel to the exposure frame and adjacent thereto, an exposure aperture therein, a reflective optical element having focusing power carried by the shield and positioned thereon to be spaced from the exposure frame and movable with the shield to and from a position adjacent the exposure frame and in axial alignment with the objective and adapted, when adjacent the exposure frame, to receive and focus light rays from the objective into an aerial image in a viewable position to define the field of view.

12. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the exposure frame and the objective, a mirror near the front wall thereof, and a viewing opening in the rear wall above the exposure frame for viewing the image reflected by the mirror along a line substantially parallel to the axis of the objective, said movably mounted means comprising a slotted frustro-conical shaped member mounted to swing the slot past the exposure frame for making an exposure.

13. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the exposure frame and the objective, a mirror near the front wall thereof, and a viewing opening in the rear wall above the exposure frame for viewing the aerial image reflected by the mirror along a line substantially parallel to the axis of the objective, said movably mounted means comprising a frustro-conical shaped member having a slot therein, a pivot therefor inclined at substantially 45° to the axis of the objective, the frustro-conical-shaped member having a generation line substantially parallel to the exposure frame and adjacent thereto.

14. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the objective and the exposure frame, a mirror near the front wall thereof, and a viewing opening in the rear wall above the exposure frame for viewing the image reflected by the mirror along a line substantially parallel to the axis of the objective, said movably mounted member including a pivotally mounted frustro-conical member having two slots therein so spaced that one may swing past the exposure frame to make an exposure, and the other may swing past the viewing opening, said frustro-conical member having a generation line substantially parallel to and adjacent the exposure frame of the camera.

15. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the exposure frame and the objective, a mirror near the front wall thereof, and a viewing opening in the rear wall above the exposure frame for viewing the image reflected by the mirror along a line substantially parallel to the axis of the objective, said movably mounted member including a pivotally mounted frustro-conical member having a generation line parallel and close to the exposure frame and having two slots therein so spaced that one may swing past the exposure frame to make an exposure, and the other may swing past the viewing opening with one slot moving across the exposure opening, while the other slot lies out of the path of the viewing opening.

16. In a camera, the combination with a camera body of an objective on the front of the body, an exposure frame near the rear wall of the camera, and means movably mounted between the objective and exposure frame comprising a frustro-conical member including a curved wall having a generation line substantially parallel with and positioned to move close to the exposure frame, an optical element carried thereby for forming and reflecting an aerial image of the field of view toward the front of the camera and lying at least partially between the objective and exposure frame, a mirror near the front wall thereof, and viewing opening in the rear wall above the exposure frame for viewing the image reflected by the mirror along a line substantially parallel to the axis of the objective, a pivotal mount for said means movably mounted between the objective and exposure frame, said means movably mounted between the objective and exposure frame including two slots therein so spaced that the frustro-conical member is lying in a position to uncover the viewing opening after an exposure has been made by swinging one slot of the frustro-conical member across the exposure frame.

17. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the exposure frame and the objective, a mirror near the front wall thereof, and a viewing opening in the rear wall above the exposure frame for viewing the image reflected by the mirror along a line substantially parallel to the axis of the objective, said movably mounted member including a pivotally mounted frustro-conical member, the generation line of which may be parallel to and near the exposure frame, said frustro-conical member having two slots therein, a pivoted mount for said member, means for turning said member on said mount between a view-exposing position in which one slot exposes the field of view and an exposing position in which the other slot exposes the exposure frame.

18. In a camera, the combination with a camera body of an objective on the front of the body, an exposure frame near the rear wall of the camera, and means movably mounted between the objective and exposure frame and positioned to move close to the exposure frame for forming and reflecting an aerial image of the field of view toward the front of the camera and at least partially between the exposure frame and the objective, a mirror near the front wall thereof, and a viewing opening in the rear wall above the exposure frame for viewing the image reflected by the mirror along a line substantially parallel to the axis of the objective, said movably mounted member including a pivotally mounted frustro-conical member, the generation line of which may be parallel to and near the exposure frame, said frustro-conical member having two slots therein, a pivoted mount for said member, means for turning said member on said mount between a view-exposing position in which one slot exposes the field of view and an exposing position in which the other slot exposes the exposure frame, the spacing of the frustro-conical member slots being such that only one of the slots may move to an exposing position at one time.

19. In a camera, the combination with a camera body of an objective on the front of the body, an exposure frame near the rear wall of the camera, and means movably mounted between the objective and exposure frame and positioned to move close to the exposure frame for forming and reflecting and focusing an aerial image of the field of view slightly in front of the means movably mounted between the objective and the exposure frame and optical elements carried by the camera for viewing the image so formed, said means movably mounted between the objective and exposure frame including a curved surface, the generation line of which may lie adjacent and substantially parallel to the exposure frame of the camera body.

JOSEPH MIHALYI.